United States Patent [19]

Gottardo

[11] 4,188,255

[45] Feb. 12, 1980

[54] PRICE LABELLING APPARATUS

[75] Inventor: Guido Gottardo, Marghera, Italy

[73] Assignee: Tovel S.p.A., Mestre, Italy

[21] Appl. No.: 880,608

[22] Filed: Feb. 23, 1978

[51] Int. Cl.[2] .............................................. B32B 31/00

[52] U.S. Cl. .................................... 156/384; 101/287; 101/288; 156/577; 156/579

[58] Field of Search ....... 156/384, 577, 579, DIG. 24, 156/DIG. 37, DIG. 48, DIG. 49; 101/287, 288, 290, 292, 293, 295, 316, 327, 368, DIG. 21

[56] References Cited

U.S. PATENT DOCUMENTS

| | | | |
|---|---|---|---|
| 2,502,257 | 3/1950 | Hawkins et al. | 156/DIG. 49 |
| 2,663,444 | 12/1953 | Kaplan | 156/DIG. 48 |
| 3,062,136 | 11/1962 | Lieberman | 101/287 |
| 3,265,553 | 8/1966 | Kind et al. | 156/384 |
| 4,056,424 | 11/1977 | Hamisch | 156/384 |

*Primary Examiner*—Caleb Weston

[57] ABSTRACT

A price labelling apparatus comprises a lever brake centrally and pivotally mounted to a pivot pin rigid with a fixed unit and having a first end adapted to exert pressure on the label web, and a second end at a position opposing an adjustable projection element extending from a movable unit and biassing the second end of the lever brake such as to cause the first end to adhere to the label carrying web.

6 Claims, 9 Drawing Figures

PRICE LABELLING APPARATUS

BACKGROUND OF THE INVENTION

This invention relates to a price labelling apparatus, particularly for manual operation.

Manually operated machines are currently known and available for printing and dispensing small size labels to be affixed to goods, to indicate the price or other features thereof. Such labels are normally supported, in a pre-cut condition, on paper webs or other similar materials.

Such prior art price labelling machines generally comprise an entraining device which advances the label web first through a printing station and then through a dispensing station, and a printing assembly or unit consisting of a printing head proper, an inking device, and an assembly for the selection of the characters to be printed. Such pricing machines also include, in general, a mechanism for positioning the stamp on the label.

The web entraining and advancing mechanism is actuated manually through a pliers type of handle, the releasing whereof triggers a constant pitch advance movement, such as to ensure for the printing operation to occur always at the same location with respect to the label.

Such known pricing machines further comprise a fixed tensioner for maintaining the web under slight tension, particularly for holding it as a label is detached, and a magazine for the label carrying web.

The machine handle is brought back to its rest position through the bias of a return spring.

Such price labelling machines are often of complex construction, a potential source of failure and at the origin of hard manual operation characteristics since the return spring, whose action is to be overcome in order to trigger the apparatus, additionally to the web tensioner resistance; constantly in a braking position, must also overcome the frictional resistance set up on contacting the printing head with the inking device. This "hard" operation feature is especially objected to by the operator, who is generally required to perform a very high number of such consecutive operations.

A fixed web tensioner may also cause malfunctioning when the pricing machine is to be used with incorrectly cut labels or with a web having a different thickness dimension from that wherefor the machine has been designed, or with different adhesives, e.g. more powerful ones.

Another frequent inconvenience of the prior art pricing machines is the difficulty encountered in withdrawing the printing assembly for servicing or replacement.

Furthermore, the shifting of the printing position on the label is often also difficult and time consuming.

SUMMARY OF THE INVENTION

The task whereon the present invention is based is to obviate the cited drawbacks of the prior art price labelling machines.

Within the scope of such a task, it is an object of this invention to provide a device for adjusting the braking action of a pricing machine, as a function of the web being used and of the machine operational step.

It is another object of the invention to provide a pricing machine which allows for an easy and quick removal of the printing assembly, without involving the removal of any other parts of the machine.

A further object is to provide a device permitting an easily carried out positioning of the imprint with respect to the label.

Yet another object of the invention is to provide a pricing machine which requires a minimal effort of the operator's hand.

That task is accomplished and said objects are achieved by a price labelling apparatus, (according to the invention), comprising: a movable unit and a fixed unit respectively rigid with a movable control arm and a fixed control arm, said units being in engagement with a label carrying web entrainment device, with a printing head, with an inking device, with supports for said printing head, means adapted to select the print characters, means for positioning the stamp on the labels; said apparatus being characterized in that it comprises a lever brake, centrally and pivotally mounted to a pivot pin rigid with said fixed unit, and having a first end adapted to exert pressure on the label web, and a second opposite located end at a position opposing an adjustable projection element extending from said movable unit, said element biassing said second end of said lever brake such as to cause said first end to adhere to said label carrying web.

BRIEF DESCRIPTION OF THE DRAWINGS

Further features and advantages of the invention will be more apparent from the following detailed description of a preferred embodiment thereof, illustrated by way of example in the accompanying drawing, where.

DESCRIPTION OF THE PREFERRED EMBODIMENTS

Figure 1:
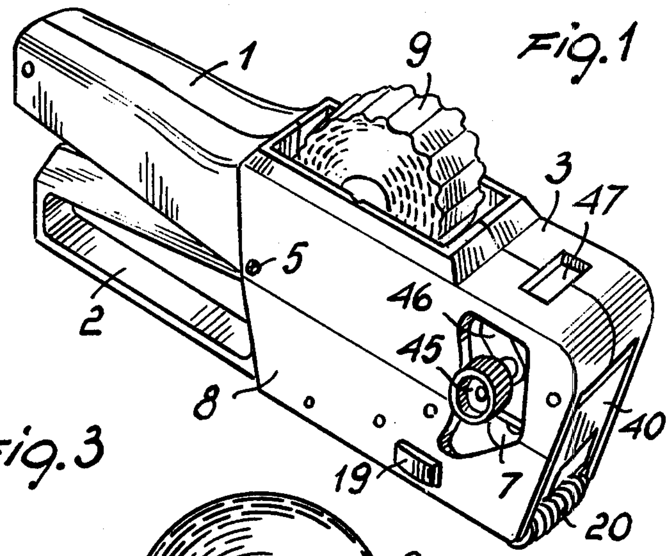
FIG. 1 is a perspective view of a price labelling apparatus according to this invention.

Making reference to FIGS. 1 to 9, the price labelling apparatus of the invention comprises a body or frame formed by a fixed unit and movable unit, respectively rigid with a fixed arm 1 and movable arm 2, constituting the handle for manual engagement by the operator's hand. More specifically, the fixed arm 1 extends into a fixed frame 3 forming the main element of said fixed unit, to which fixed frame 3 said movable unit 6, in turn providing support for a printing head 7, is journaled through a first pivot pin 5.

On the inner member side, the apparatus is closed by a cover 8 which is secured by means of screws to the fixed frame 3.

A label carrying web 9, in coil or roll form, is inserted in a specially provided recess or cavity 10 and receives support by a respective pin 11.

The fixed arm 1 and movable arm 2 are held open, at their rest positions, by a return spring 12, stretched between a first detent 13 rigid with said fixed arm 1 and a second detent 14 rigid with said movable arm 2.

Provision is made for a web entraining device mounted to a tiltable support arm 15, which is substantially of one piece construction and journaled at one end to said fixed frame 3 by means of pins 16, coaxial to each other and projecting from opposite inner faces of said frame 3 and cover 8. The tiltable supporting arm 15 is further secured to said fixed frame 3 through a snap action latch formed by a shaft 17 and spring 18 acting on said shaft. The latter may be released from the outside through knobs 19. Such knobs and shaft will be oversize with respect to the loads normally expected to act thereupon.

The other end of the tiltable supporting arm 15 carries and idle roller 20.

Close to said pins 16, the supporting arm 15 carries an entraining drum 21 for the label web 9. Said drum 21 is driven through a pawl and ratchet type of drive 22, comprising substantially toothed wheels 23 mounted rigid with the drum flat sides and levers 24, which act with one end on said toothed wheels 23 and with the opposite end 25 pivotally associated with the movable unit 6 of the machine, in a position substantially in alignment with the tiltable base 15 in a working position.

Such levers act as compression loaded struts on the toothed wheels 23 and have their other active end substantially straight.

The entraning drum 21 is wrapped along a portion thereof in a covering member 26 caused to adhere to the drum by a leaf spring 27 which is held pivotally at one end by a screw 28 inserted through said tiltable supporting arm 15.

Figure 7:
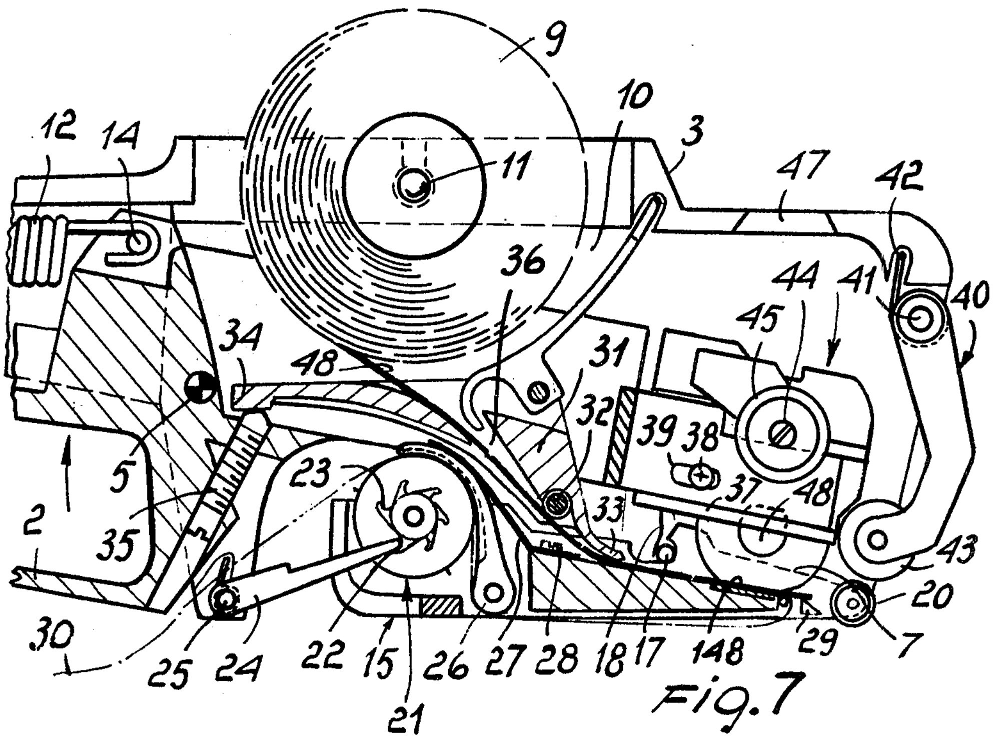
FIG. 7 is a longitudinal section of the apparatus, shown during the label printing step.
Figure 8:
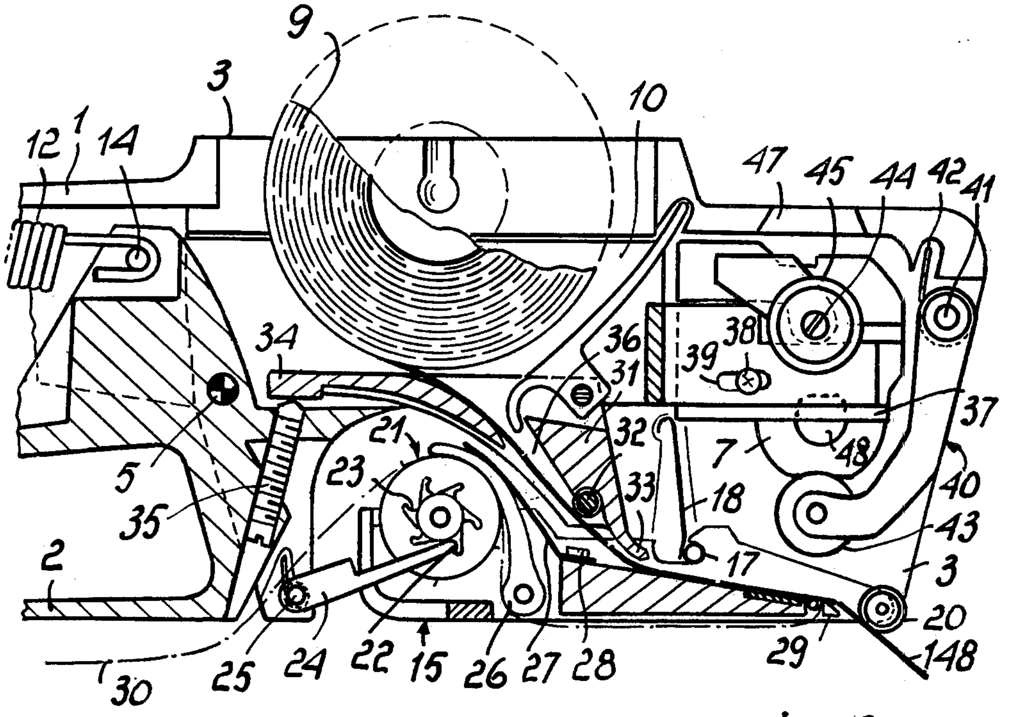
FIG. 8 is a longitudinal section of the apparatus, shown during the label dispensing step.
Figure 9:
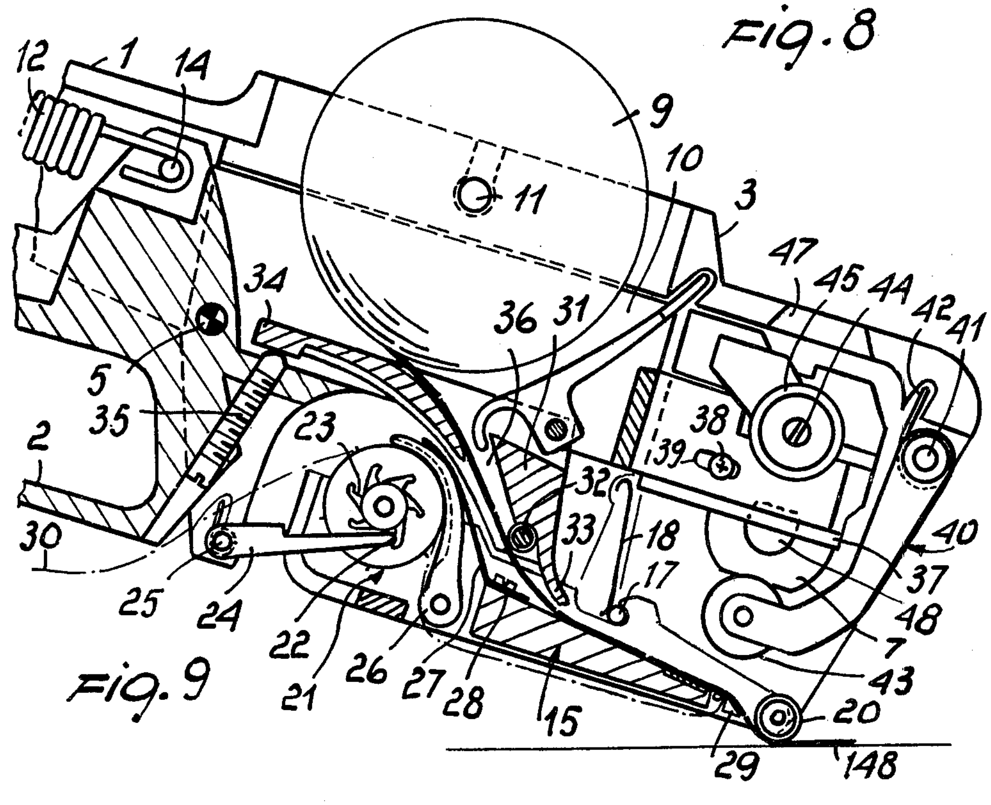
FIG. 9 is a longitudinal sectional view of the apparatus, shown during the label applying step.

Close to the idle roller 20, there are sharp cornered bosses 29 effective to facilitate the label separation from the web, the path whereof is indicated with a dash-and-dot line in FIGS. 7,8, and 9.

Located above said entraining device, there is a web tensioning brake 31, which is mounted for oscillation about a second pin 32 and engages with the fixed frame 3. Said brake 31 is configurated as a lever pivoted to the second pin 32 and having a first end 33 which acts on the label carrying web bearing on the support arm 15, and the second end 34 arranged to detent an adjustable projecting element comprising an adjusting screw 35, in engagement with the movable unit or movable assembly 6 of the machine. Said brake 31 has in a substantially central position and directly adjacent the second pin 32, a slot 36, wherethrough the label web is made to pass prior to its extension along the tiltable supporting arm 15.

The printing head 7 of the pricing apparatus according to this invention is associated at the front with the movable unit or assembly 6, through guides 37 formed in said movable unit 6 such as to allow a longitudinal sliding movement of said printing head.

The position of the printing head 7 along said guides 37 is established by connecting means comprising a screw 38 inserted through a slotted hole 39 formed in said movable unit 6.

The printing head is completed by an inking device 40, journaled with one end to the fixed frame 3 through a third pin 41 and held in contact with the printing head 7 by a second leaf spring 42. Said inking device 40 is provided at its free end with a roller-like pad 43, idly mounted.

The printing head 7 comprises a set of print character carrying rings and a corresponding set of figure reading and setting rings, said rings being in mesh engagement with one another.

The figure to be printed is set by means of a second shaft 44, capable of rotating and move axially for ring selection. Said second shaft is operated through a knob 45 projecting from the cover 8 through a first large opening 46.

A second opening 47 formed in the upper face of the labelling machine allows the figure being set to be seen.

Figure 3:
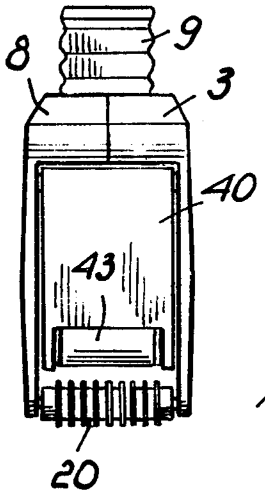
FIG. 3 is a front view of the apparatus.
Figure 2:
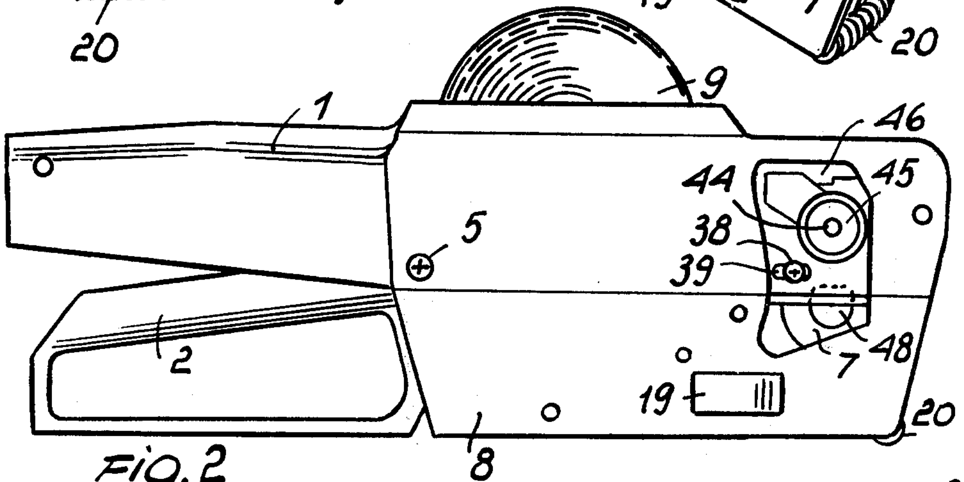
FIG. 2 is a side view of the apparatus.
Figure 4:
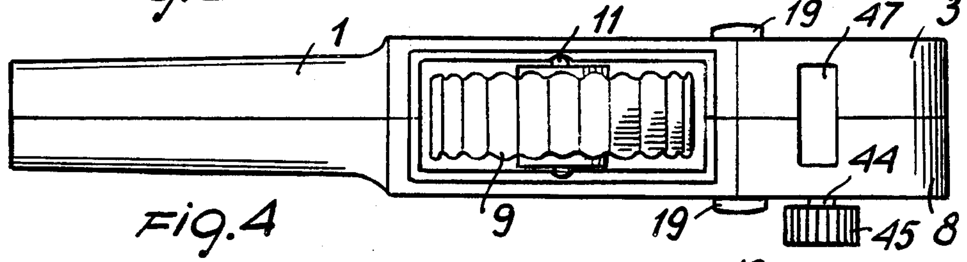
FIG. 4 is a top view of the apparatus.
Figure 5:
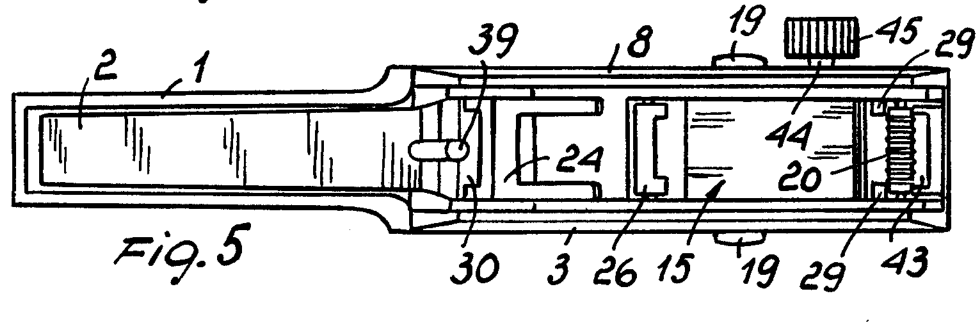
FIG. 5 is a bottom view of the apparatus.
Figure 6:
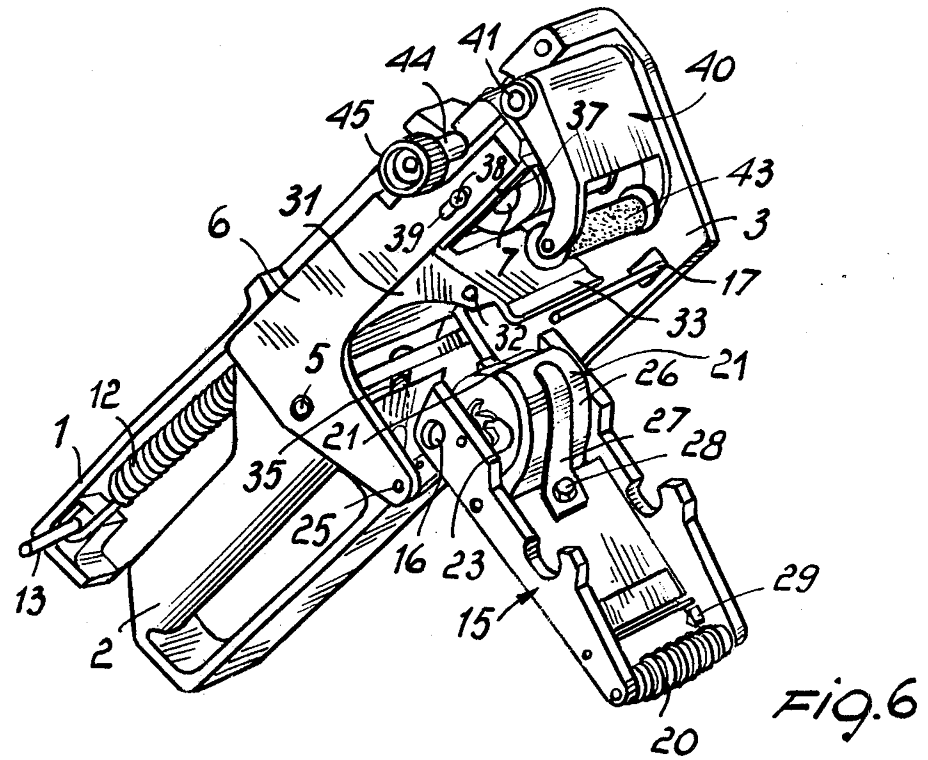
FIG. 6 shows in perspective the inner components of the price labelling apparatus with its side cover removed.

The front face of the labelling machine is fully open, as shown particularly in FIGS. 1,3 and 6, it being only engaged by the inking member 40 which may be raised by rotation about the third pin 41.

The printing character rings are associated to the printing head 7 by means of a first shaft 48, a portion of the cylindrical surface whereof is flattened such as to prevent its rotation.

The apparatus operates as follows.

As an operator squeezes together the fixed arm 1 and movable arm 2 of the labelling machine handle, the label printing step is carried out, as shown particularly in FIG. 7. During that step, the printing head 7, being supported by the movable structure 6 which rotates clockwise about the first pin 5, is lowered until it contacts the label carrying web, bearing on the supporting arm 15.

Simultaneously with the above, the brake 31 is rotated counterclockwise about its second pin 32, being actuated at its second end 34 by the adjusting screw 35, rigid with the rotating movable unit 6. Thus, the first end 33 of said brake 31 releases the label web on the supporting arm 15.

By screwing in or out the adjusting screw 35, it becomes possible to adjust the braking force acting on the web, according to the condition and thickness thereof.

Again during the descent of the printing head 7, the characters to be printed are inked by the pad and roller 42, which advantageously contacts the printing head 7 in rolling engagement, thereby less friction occurs than with a sliding contact.

As the operator releases his grip on the handle, the label dispensing step takes place, more specifically illustrated in FIG. 8.

During that step, the fixed arm 1 and the movable arm 2 are returned to their rest position by the return spring 12, which is put under tension during the printing step.

The movable structure 6 rotates in a counterclockwise direction with respect to the first pin 5, thus raising the printing head 7. At the same time, the web tensioning brake device 31 performs a clockwise rotation about the second pin 32, thus blocking the label web.

The rotation of the movable structure 6 cocks the ratchet and pawl advance mechanism 22 of the drum 21: the strut levers 24 acting on the toothed wheels 23 cause the web entraining drum 21 to rotate with constant length pitch, thus causing the label web to advance, the last label whereof, as indicated at 148 in FIG. 8, partially peels off the web, being favored in so doing by the sharp cornered boss 29, and projects with a portion thereof out of the machine. The subsequent label applying step, shown particularly in FIG. 9, effects the separation of the label 148 by simple pressure onto the surface 49 of the object intended to receive the label, said label being further pressed by the idle roller 20, with uniform pressure throughout its surface.

The position of the stamp on the label is adjustable by varying the position of the printing head 7 with respect to the slot 39 in the movable unit 6, by acting on the screw 38. Such a screw is accessible from the outside without disassembling the housing 8, through the first opening 46.

By fully unscrewing the screw 38 it is possible to withdraw, by sliding it off along the guides 37, the whole printing head 7 through the front face of the labelling machine, such a face being open internally for this purpose.

It has been proved in actual tests that the apparatus described herein requires a minimal effort by the operator's hand, thanks to the fact that the friction between the printing head and pad is of the rolling type and thanks to the use of a return spring between the movable arm and fixed arm the action whereof is specially reduced, and thus easy to overcome. This latter feature derives from that the action of the braking device is substantially nil during the manual operation step, said step being in fact carried out under the bias of said spring.

Such an apparatus as disclosed herein further allows for an easy and quick removal of the whole printing head from the front face of the apparatus. This is specially advantageous in that it eliminates the necessity for disassembling the fixed structure of the machine whenever, owing to wear or other reasons, it is desired to replace or service the printing head.

By virtue, moreover, of the constructional simplicity and positioning of said mechanical braking device and web advancing mechanism, there remains available, for accomodating the web roll, a cavity substantially contained within the apparatus. The web roll only projects by a limited portion thereof from the machine body, which may thus be of compact design.

Other advantages are:

the capability of adjusting the braking action of the mechanical braking device according to the type of web being use;

the simple and quick positioning of the stamp on the label, without involving any disassembling of the labelling of the machine fixed structure;

the coupling of the character carrying rings to the printing head by means of a cylindrical shaft, only partly flattened, with an accurate centering and reduction of contact wear; and the operation and construction simplicity, which permits low cost manufacturing methods.

In practicing the invention, the materials and dimensions used may be any ones, to suit individual requirements.

I claim:

1. A price labelling apparatus comprising: a movable unit and a fixed unit respectively rigid with a movable control arm and a fixed control arm, said units being in engagement with a label carrying web entrainment device, with a printing head, bearing print characters with an inking device, with supports for said printing head, means adapted to select the print characters, means for positioning the stamp on the labels; said apparatus being characterized in that it comprises a lever brake, centrally and pivotally mounted to a pivot pin rigid with said fixed unit, and having a first end adapted to exert pressure on the label web, and a second opposite located end at a position opposing an adjustable projection element extending from said movable unit, said element biassing said second end of said lever brake such as to cause said first end to be maintained biased against said label carrying web.

2. A price labelling apparatus according to claim 1, characterized in that said adjustable projection element extending from said movable unit comprises an adjusting screw projecting and pivotally engaged in said movable unit.

3. A price labelling apparatus according to claim 1, characterized in that the printing characters are collected into rings associated to said printing head by means of a shaft, a portion of the cylindrical surface whereof is flattened such as to prevent the rotation thereof.

4. A price labelling apparatus according to claim 1, characterized in that said supports for said printing head comprise guides formed in said movable unit of said apparatus, said guides being arranged such as to permit a sliding movement of said printing head to or away from the front end portion of said apparatus.

5. A price labelling apparatus according to claim 4, characterized in that said printing head, slidable along said guides, is secured in place thereto by connecting means acting through a slot, and in that said printing head acts in opposition to a supporting arm of one piece construction.

6. A price labelling apparatus according to claim 5, characterized in that said label carrying web entrainment device is formed by a pawl and ratchet mechanism comprising an entraining drum, toothed wheels rigid with the flat sides of the drum, and levers acting as struts on said toothed wheels and journaled to said movable unit in a position of substantial alignment with said supporting arm, in a working position.

* * * * *